Figure 1:
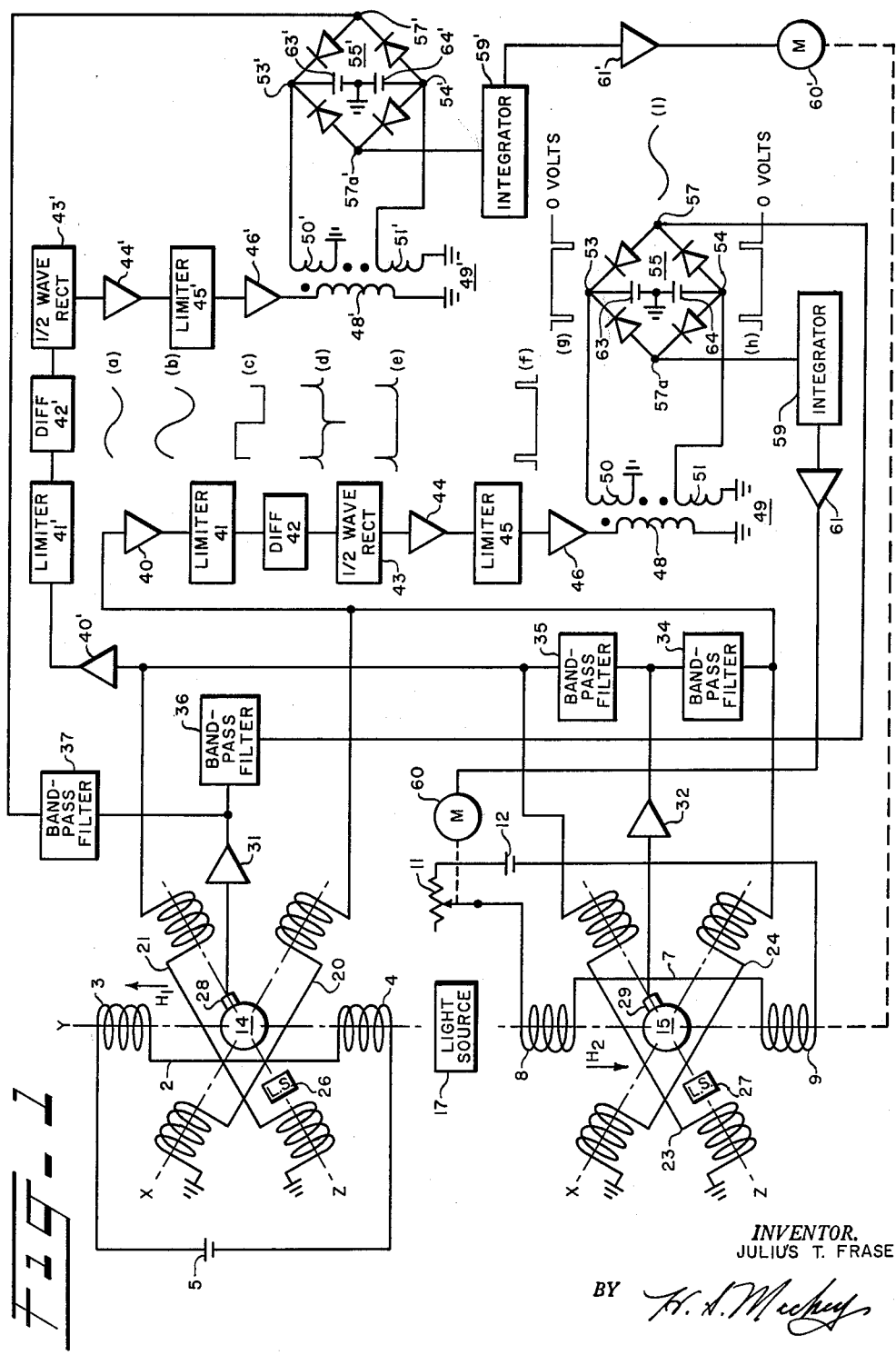

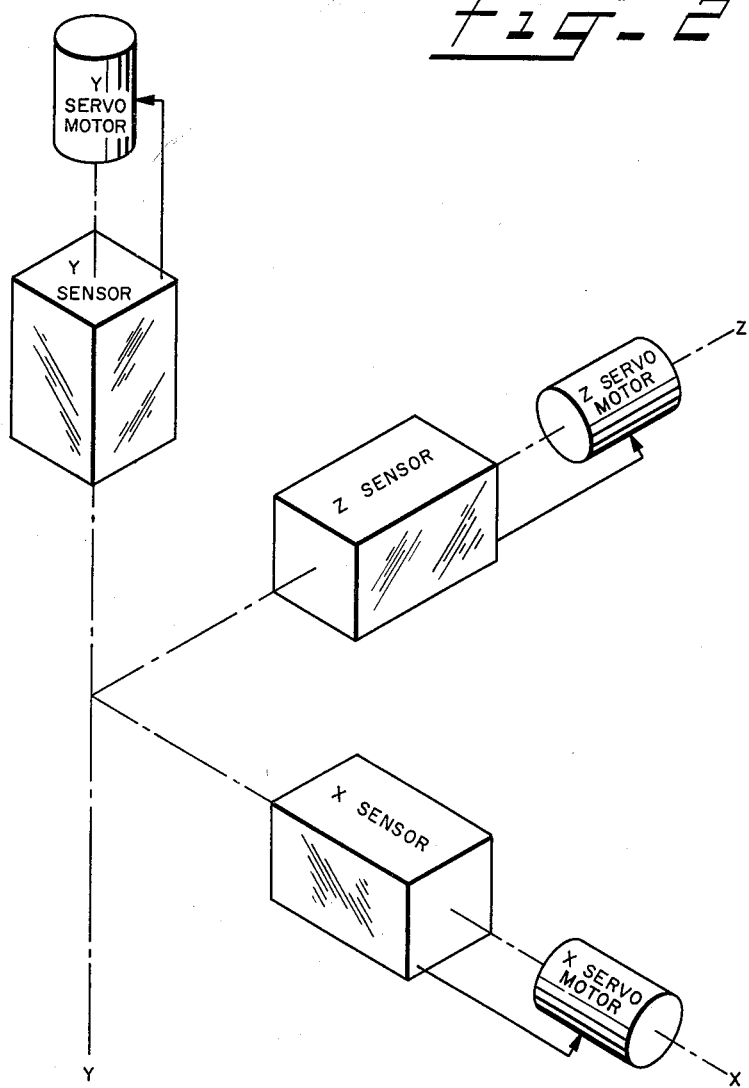

United States Patent Office 3,103,621
Patented Sept. 10, 1963

3,103,621
OPTICALLY PUMPED MAGNETIC RESONANCE GYROSCOPE AND DIRECTION SENSOR
Julius T. Fraser, Pleasantville, N.Y., assignor to General Precision, Inc., a corporation of Delaware
Filed Jan. 13, 1960, Ser. No. 2,306
12 Claims. (Cl. 324—.5)

This invention relates to gyroscopes and direction sensors and more particularly to optically pumped magnetic resonance gyroscopes and direction sensors suitable for detecting the angular displacement of an object with respect to an inertial frame and correcting for same.

This invention is very useful in the field of navigation and particularly so in the field of inertial guidance since it may be used to replace conventional gyroscopes or direction sensors which are subject to drift due to the presence of friction in the gimbal bearings and supports.

It has been established for some time that certain substances exhibit nuclear magnetic and paramagnetic resonance under conditions which will be described. When any of these substances, in vapor or gas form, are placed in a unidirectional homogeneous magnetic field and irradiated with photon energy of the correct frequency, sometimes identified as photon resonance radiation, the electrons associated therewith in the case of paramagnetic resonance and the nuclei in the case of nuclear magnetic resonance will be removed from the thermal equilibrium condition and an inequality in the population of predetermined Zeeman substates will result. The photon resonance radiation will have a frequency depending on the substance selected, falling somewhere between about $10^3$ kilomegacycles and about $10^8$ kilomegacycles.

If an alternating magnetic field at the Larmor frequency of the substance is applied at right angle to the unidirectional field the macroscopic moment of the electrons or the nuclei as the case may be will precess about the unidirectional field at the above mentioned Larmor frequency. The Larmor frequency in the case of electron or paramagnetic resonance is a function of the unidirectional field strength and the gyromagnetic ratio of the electron and may be defined by the following equation:

$$\nu_L = \frac{e}{2mc}gH = \gamma_{eff}H$$

where ($\gamma_{eff}$) is the effective gyromagnetic ratio of the electron, (H) is the strength of the magnetic field, (g) is a constant for each substance called the spectroscopic splitting factor, (e) is the charge of the electron, (m) is the mass of the electron, and (c) is the speed of light. The value of (g) for a given substance may be determined theoretically but is best chosen from the many reference sources available where it has been tabulated after experimental determination, see for example, Handbook of Physics, Condon and Odishaw McGraw-Hill 1958, part 7.

The Larmor frequency in the case of nuclear resonance is similar and may be defined by the following equation:

$$\nu_L = \gamma H$$

where ($\gamma$) is the gyromagnetic ratio of the nucleus and (H) is the strength of the magnetic field.

If the frame of reference containing the substance is stabilized in space the frequency an observer on that frame would detect would be the Larmor frequency ($\nu_L$). If, however, the frame were to rotate about the axis of the field H at a frequency ($\omega$) then the observed frequency would be ($\nu_L \pm \omega$) depending on the direction of rotation. That is, if the direction of rotation was the same as the direction of precession then the observed frequency would be less than ($\nu_L$) by the value of ($\omega$), and if it were opposed it would be greater by the value of ($\omega$). Sustained precession may be obtained by continuously applying an alternating magnetic field which leads the phase of the magnetic moment of the precessing particle by 90°.

From the above facts one may deduce that the phenomenon of magnetic resonance is a potent device suitable for replacing the mechanical gyroscope with its inherent drift limitation. But before replacement could be made a number of problems required solution. The most important of these is stabilization of the strength of the field (H) since any reading of ($\omega$) which one might obtain is dependent thereon. If the value of (H) is not stabilized or accurately known, the apparent Larmor frequency, designated $\nu_{LA}$, which equals $\gamma_{eff}H \pm \omega$ in the case of the electron and $\gamma H \pm \omega$ for the nucleus may be influenced by either a variation in the field strength (H) or any angular displacement of frequency ($\omega$). A second perplexing problem is the measurement of ($\omega$) since the difference between $\nu_L$ and $\nu_{LA}$ which is equal to ($\omega$) when (H) is held constant is small compared to the magnitude $\nu_L$. These, and many other problems, which will be set forth in detail later, require solution before a successful optically pumped magnetic resonance direction sensor suitable for use in a navigation or inertial guidance system can be constructed.

One object of this invention is to provide an optically pumped magnetic resonance direction sensor suitable for detecting angular displacement with respect to an inertial frame and for supplying signals corresponding thereto.

Another object of this invention is to provide an optically pumped direction sensor which is impervious to fluctuations in field strength.

A further object of the invention is to provide an optically pumped direction sensor in which small frequency changes are detected as phase shifts to improve both the accuracy and reliability of the device.

Yet another object of the invention is to provide optically pumped direction sensors which are accurate and reliable and suitable for use in navigation and inertial guidance systems in place of the well known mechanical gyroscopes.

The invention contemplates an optically pumped magnetic resonance direction sensor comprising, means for providing two substantially equal and opposite unidirectional magnetic fields spaced from each other and parallel to a common axis. A first container for enclosing two dissimilar substances each of which exhibits magnetic resonance when properly excited located in one said fields and a second identical container located in the second unidirectional field. Means for irradiating said containers with energy at the resonant frequency of at least one of the substances in said containers to produce inequalities in the population of predetermined Zeeman substates of each substance. Means associated with each unidirectional field for providing an alternating magnetic field having a frequency equal to the Larmor frequency of each substance to cause forced precession of the magnetic moments of the substance about the axis of the unidirectional fields. Readout means for detecting the precessional frequencies of the magnetic moments of the substances and supplying electric signals corresponding thereto, and phase comparison means for comparing the phase of the signals corresponding to the precessional frequency of similar substances in the two fields and providing signals for indicating the magnitude and direction of any phase shift.

The foregoing and other objects and advantages of the invention will appear more clearly from a consideration of the specification and drawings wherein one embodiment of the invention is described and shown in detail for illustration purposes only.

In the drawings:

FIGURE 1 is a schematic and block diagram showing a novel optically pumped magnetic resonance gyroscope for stabilizing a structure about a single axis; and FIGURE 2 is a block diagram showing a novel magnetic resonance gyroscope for stabilizing a structure about three axes.

In FIGURE 1, a coil 2 which is preferably of the Helmholtz type has upper and lower portions 3 and 4, respectively, connected in series across a battery 5 to provide a substantially uniform field $H_1$ in the area between the two coils. The connection of battery 5 and the arrangement of windings 3 and 4 are such that the field $H_1$ is directed upwardly and parallel to the axis marked Y. A second coil 7 similar to coil 2 has upper and lower portions 8 and 9, respectively, connected in series with a potentiometer 11 across a battery 12 to provide a substantially uniform field $H_2$ in the area between coils 8 and 9. The connection of battery 12 and windings 8 and 9 are such that the field $H_2$ is directed downwardly and parallel to the Y axis. Potentiometer 11 is provided to automatically adjust the current in coils 8 and 9 so that the fields $H_1$ and $H_2$ will be of equal strength. The operation of potentiometer 11 will be discussed in full detail at a later time.

As shown in the drawing, fields $H_1$ and $H_2$ are colinear. That is, they are in a line parallel to and equally spaced about the Y axis. This is not a requirement and is only one way of arranging the fields. The only limitations on the location of the fields is that they be parallel to the Y axis and angularly fixed with respect to the Y axis. Stated differently, the coils can be moved in any direction and at any time as long as they do not move around or about the Y axis except as will be described later. They may be moved up or down toward or away from the axis and and in opposite directions without affecting the operation. If, however, they should be moved or rotated about the Y axis the readings supplied by the device would be altered by an amount depending on the rate of such rotation. This will become obvious as the description progresses. Notwithstanding what has been said the coils may be in any angular position before the device is operated and the limitation as to angular movement applies only once the device is in operation.

In all of the discussion so far, both the earth's magnetic field and any stray fields which might be present have been ignored since the device is enclosed within a magnetic shield, not shown, to eliminate their effect.

Two identical containers 14 and 15, constructed of a transparent non-magnetic material, are located in fields $H_1$ and $H_2$ respectively. The contents of containers 14 and 15 are identical and each contains two different substances which exhibit magnetic resonance when properly stimulated in the manner which will be described in detail later. The two substances may be selected from amongst those substances containing nuclei and paramagnetic materials which exhibit magnetic resonace.

Two paramagnetic materials which exhibit electron magnetic resonance and are quite suitable for use in this apparatus are rubidium 87 and sodium 23 both in their vapor form. If desired a buffer gas such as argon may be mixed with the rubidium and the sodium to increase the efficiency and accuracy of the device. The buffer gas extends the relaxation time of the electrons by decreasing the collision rate between the rubidium atoms and between the sodium atoms which results in a decrease in the rate of coherence loss between the phase of the precessing electrons.

A source of monochromatic circularly polarized sodium light 17 is positioned such that containers 14 and 15 are irradiated with the energy emitted by source 17. When the rubidium and sodium samples in the containers are subjected to the fields $H_1$ and $H_2$ the electrons associated with each assume or are constrained to two orientations or levels, often called "Zeeman levels," of different energy values. The sodium electrons absorb the energy radiated by the source 17 and those electrons in the lower energy state are transferred to the higher energy level thus increasing the population of the higher energy level at the expense of the lower energy level to provide a net macroscopic moment.

In the embodiment chosen for illustration source 17 emits only sodium light and the rubidium electrons are transferred to a hgiher energy level by spin exchange collisions with the sodium electrons. If desired, source 17 could be arranged to emit photon energy of both rubidium and sodium wave length and the transitions for each of the electrons would be independent of each other. The technique described for implementing the transitions of the electrons from their lower energy state to the higher energy state is called "optical pumping" and has been used for many purposes with single samples. Optical pumping is highly desirable since substantially a 100% transition can be effected with a very small unidirectional field strength.

When the sodium electrons in the container are subjected to an alternating magnetic field at right angles to the unidirectional field provided by coils 2 and 7 and whose frequency is equal to or substantially the same as the Larmor frequency which was previously defined they will precess about the unidirectional magnetic fields produced by the coils at the Larmor frequency. This also applies to the rubidium electrons which have been aligned by the spin exchange collisions with the sodium electrons. However, in the case of the rubidium electrons the frequency of the alternating field and the precession frequency of the rubidium electrons will differ since the effective gyromagnetic ratio of the rubidium electron differs from that of the sodium electron. Actually sodium and rubidium were chosen in the first place because their Larmor frequencies differed by a substantial amount. The reason for this choice will become apparent as the description continues.

Two alternating fields at right angles to the unidirectional field $H_1$ are produced by a pair of coils 20 and 21 each of which is energized by a current of the correct frequency in a manner which will be described later. Similarly the two alternating magnetic fields at right angles to the unidirectional field $H_2$ are produced by a pair of coils 23 and 24. The angular position of coils 20, 21, 23 and 24 is immaterial and the only restriction on their position is that the fields produced by each coil be normal to the unidirectional fields $H_1$ and $H_2$ as the case may be.

The frequency of precession of the sodium electrons about the unidirectional magnetic fields $H_1$ and $H_2$ when the platform on which the containers 14 and 15 rest is stabilized about the Y axis with respect to inertial space may be computed from the formula: Frequency of precession of sodium electrons $=\gamma_{eff}\text{Na}H$ where $\gamma_{eff}\text{Na}$ is the gyromagnetic ratio of the sodium electron and $H$ is the strength of the field $H_1$ or $H_2$ depending on which of the containers we are considering. Thus, if both $H_1$ and $H_2$ are identical the frequency of precession of the sodium electrons in container 14 will be identical to the frequency of precession of the sodium electrons in container 15. If, however, $H_1$ and $H_2$ differ, the precessional frequencies of the sodium electrons in containers 14 and 15 will differ by an amount which corresponds to the difference in the field strength.

Likewise the frequency of precession of the rubidium electrons about fields $H_1$ and $H_2$ under the conditions previously set forth may be determined by the formula:

Frequency of precession of rubidium electrons $=\gamma_{eff}\text{Rb}H$ where the symbols denote the same qualities as stated above except with respect to the rubidium electrons. Here also the precessional frequency of the rubidium electrons in containers 14 and 15 will differ if the fields $H_1$ and $H_2$ differ in strength. This difference also corresponds to the difference in field strength.

While the magnetic moments of the sodium and the rubidium electrons in container 14 precess at the same frequency as their respective counterparts in container 15, they are, however, precessing in the opposite directions due to the 180° phase reversal of field $H_2$ with respect to field $H_1$ and therefore we may say the precession of the magnetic moments of the electrons in one container are of opposite phase to their counterparts in the other container.

If we now impart an angular velocity to containers 14 and 15 which causes said containers to rotate at a frequency $(\omega)$ about the Y axis the observed frequency of precession will be reduced in one container and increased in the other by the value of $(\omega)$ since the angular velocity, depending on its direction, augments the precession of the moments in one container while it detracts from those in the other container. This may be expressed algebraically by the following equations:

$f$ (precession sodium electron) $= \gamma_{eff} NaH \pm \omega$
$f$ (precession rubidium electrons) $= \gamma_{eff} RbH \pm \omega$ Thus, if the angular velocity imparted about the Y axis is such as to add to the observed precessional frequencies of the magnetic moments of the sodium and rubidium electrons in container 14 those observed in container 15 will be reduced by a similar amount, and the difference in the precessional frequencies of similar electrons in the two containers will equal twice the frequency of the angular velocity about the Y axis.

We now have a means for determining the angular rotation about the Y axis with respect to inertial space if we can be sure that the difference in the observed precessional frequency is due solely to an angular rotation. This can be accomplished by insuring that both fields, $H_1$ and $H_2$, are always equal since under this condition any observed difference in frequency can only be due to an angular rotation.

It should be obvious from what has been said that if a difference in the precessional frequency between two similar electron magnetic moments is observed and that difference is the result of a change in the value of one of the fields which results in one precessional frequency increasing or decreasing, depending on whether the field increased or decreased, then the difference in frequency between the observed frequency of the magnetic moments of the other similar electrons will undergo a proportional change. Thus if we continually measure the difference in the precessional frequency of the sodium electron moments in containers 14 and 15 we may derive an error signal which can be used to adjust one of the fields so as to null the difference in frequency between the sodium electron magnetic moment precessions and the rubidium electron magnetic moment precessions and at the same time maintain both fields ($H_1$ and $H_2$) at the same field strength.

If, however, the difference in frequency is due to an angular displacement about the Y axis which was caused by a rotation whose frequency is $(\omega)$ the mere adjustment of the strength of one of the fields can never eliminate the difference between the precessional frequencies of the magnetic moments of the rubidium electrons in the two containers, since an angular displacement which was caused by the rotation about the Y axis does not effect the difference frequencies of the two similar precessing moments in the containers proportionally. This is so because the frequency of the rotation causing the displacement is linearly added to and subtracted from the precessional frequency of the magnetic moments of the electrons and therefore no proportionality factor exists. Thus, by properly adjusting time constants we may first utilize the difference between the precessional frequencies of the sodium electron magnetic moments to adjust the fields to equilibrium and if unsuccessful after a predetermined time we have established that the difference was caused by an angular displacement; and second utilize the difference between the precessional frequencies of the rubidium electron magnetic moments to generate after the predetermined time delay, an error signal for opposing the angular displacement of the containers about the Y axis. By so doing we can provide stabilization, with respect to inertial space, of the containers, about the Y axis. The time delay is adjusted to permit sufficient time for a field correction to take place. How this is implemented will be explained as the description of FIGURE 1 continues.

The precessional frequencies of the magnetic moments are detected by directing a pumping beam similar to that supplied by source 17 at right angles to the magnetic field. In this instance the intensity of the pumping beam as it traverses the container is modulated by the precessing magnetic moments of both the sodium and rubidium electrons by the well known absorption process. Thus both precessional frequencies are impressed on the light which passes through the containers in the form of an amplitude modulation. Two light sources 26 and 27 are located adjacent to containers 14 and 15, respectively, and arranged so that the light energy is directed toward the container with which each is associated. A pair of photocells 28 and 29 are located adjacent to containers 14 and 15, respectively, opposite light sources 26 and 27, respectively.

To facilitate the processing of the photocell outputs we can secure the desired 180° relationship of the output signal by placing the light sources 26 and 27 so that each source is displaced the same angular distance from coils 20 and 24, respectively, and the same distance from coils 21 and 23, respectively. In order to do this it may be necessary to rotate the coils about the Y axis so that the distances will be as specified but such movement does not otherwise affect the output. The modulated light passing through container 14 is detected by a photocell 28 and an electric signal which is its analogue is supplied to an amplifier 31 where it is amplified and undergoes a 180° phase shift.

The modulated light passing through the container 15 is detected by a photocell 29 and an electric signal which is its analogue is supplied to an amplifier 32 where it is amplified and undergoes a 180° phase shift. A pair of band-pass filters 34 and 35 are connected to the output of amplifier 32. Filtering 34 is centered at the Larmor frequency of the sodium electron and passes only the frequency component of the photocell output contributed by the precession of the sodium electron magnetic moment. Filter 35 is centered at the Larmor frequency of the rubidium electron and passes only the frequency component of the photocell output contributed by the precession of the rubidium electron magnetic moment.

The output of band-pass filter 34 is connected to coils 24 and 20 to supply the alternating magnetic field which produces forced precession. It should be noted that this field leads the sodium electron magnetic moment precession by about 90° since the 180° phase shift introduced by amplifier 32 in combination with the 90° lag of the current in coils 24 and 20 result in about a 90° lead of the alternating field. The output of band-pass filter 35 is connected to coils 23 and 21 to provide an alternating field for forcing the precession of the magnetic moments of the rubidium electrons.

Another pair of band-pass filters 36 and 37 similar to filters 34 and 35, respectively, are connected to the output of amplifier 31. Filter 36 is centered at the Larmor frequency of the sodium electron and passes only that frequency component of the output of photocell 28 which is contributed by the precession of the sodium electron magnetic moment which is precessing in container 14. Filter 36 is centered at the Larmor frequency of the rubidium electron and passes only that frequency component of the output of photocell 28 which is contributed by the precession of the rubidium electron magnetic moment which is precessing in container 14.

It has been previously pointed out that the difference in the precessional frequency of the magnetic moments of the similar electrons in containers 14 and 15 which might be due to either a difference in field strength or an angular velocity of frequency ($\omega$) about the Y axis is slight compared to the Larmor frequency. Therefore, some form of comparison other than frequency which will give the frequency difference is necessary. Here this takes the form of a phase comparison. When two alternating signals of very high frequency differ in frequency by a small amount the difference may be measured as a phase shift which is directly proportional to the difference in frequency.

The output of band-pass filter 34, curve ($a$), is amplified by an amplifier 40 whose output, curve ($b$), is applied to a limiting circuit 41 which provides a square wave output, curve ($c$). A differentiating circuit 42 differentiates the leading and trailing edges of the limiter output to provide pulses, curve ($d$), at the zero voltage or axis crossings of curve ($a$). A half-wave rectifier 43 clips the negative pulses to provide a single pulse once each cycle occuring at one zero voltage level or axis crossing and illustrated by curve ($e$). The output of rectifier 43 is amplified by an amplifier 44 and then limited by a second limiter 45 to provide a pulse, shown in curve ($f$), which has a uniform width and height and which has a very sharp rise and fall.

An amplifier 46 amplifies the pulse output of limiter 45 and applies the amplified pulse to a primary winding 48 of a transformer 49. Transformer 49 has a pair of secondary windings 50 and 51 which are oppositely wound so that the pulse outputs of the two windings are of opposite polarity. The pulses are applied to terminals 53 and 54, respectively, of a bridge circuit 55. The output of band-pass filter 36 is applied to another terminal 57 and the bridge is so arranged that the instantaneous voltage of the output of filter 36 is passed through the bridge to an integrator 59 each time pulses are applied to terminals 53 and 54. Thus, if the outputs of filters 34 and 36 are of the same frequency and 180° out of phase with each other, which is the case when fields $H_1$ and $H_2$ are equal and containers 14 and 15 are stabilized with respect to inertial space about the Y axis, the voltage at terminal 57 will be zero when the pulses are applied to terminals 53 and 54. If however, fields $H_1$ and $H_2$ differ in strength or the containers experience an angular velocity of frequency ($\omega$) about the Y axis, the frequencies will differ and the voltage present at terminal 57 when the pulses are applied to terminals 53 and 54 will be at some value greater than or less than zero depending on the relative change in fields or the relative direction of the angular velocity about the Y axis and integrator 59 will integrate this voltage and apply it to a motor 60 through a servo amplifier 61 to adjust the voltage across winding 7 and the strength of field $H_2$. If the difference in frequency is due to a field difference the integrator output applied to motor 60 via amplifier 61 will adjust potentiometer 11 to adjust field $H_2$ so that it equals field $H_1$ and the integrator output will go to zero after a minimum period of hunting with a properly designed servo system.

Bridge 55 comprises two pairs of oppositely connected diodes connected between terminals 57 and 57A and a pair of biasing batteries 63 and 64 connected between terminals 53 and 54. The common junction of batteries 63 and 64 is connected to ground and thus the terminals 53 and 54 are positive and negative, respectively, so that the diodes connected between terminals 53 and 57, and 54 and 57 are back biased except when pulses from windings 50 and 51 are applied to terminals 53 and 54, respectively. The voltages of batteries 53 and 54 must be selected so that they individually exceed the maximum value of the voltage applied at terminal 57 and low enough so that the same diodes will be forward biased whenever the pulses from windings 50 and 51 are applied to terminals 53 and 54, respectively.

The output of band-pass filters 35 and 37 are applied to similar phase comparison circuits wherein identical numbers bearing a prime designate similar components. In this instance, however, servo motor 60' is mechanically coupled to the structure bearing containers 14 and 15 to rotate that structure about the Y axis so as to oppose any angular motion about the Y axis and maintain stability of the support structure about the Y axis with respect to inertial space.

As was previously mentioned the time constant of the servo system which includes motor 60 is less than the time constant of the servo system which includes motor 60'. This permits a field correction prior to any platform correction and since no amount of field correction will null both frequency differences if they are the result of an angular velocity of frequency ($\omega$) about the Y axis, servo motor 60' will eventually take over and restore the support structure to null the system. This arrangement eliminates a certain amount of oscillation in the system and contributes greatly to smoothness of operation.

With the bridge circuit described for measuring the phase shift it is possible to detect without ambiguity phase shifts of as much as ±90°. This is more than adequate to provide effective control since it corresponds at 90° phase shift to an angular velocity about the Y axis having a frequency of about 50 r.p.s. The system will ordinarily operate on the substantially linear portion which permits accurate and substantially linear correspondence between the phase shift and the voltage applied to integrators 59 and 59' during normal operation of the system.

Bridges 55 and 55' are arranged so that the polarity of the pulses supplied to integrators 59 and 59' is dependent on the direction of the phase shift which is in turn dependent on either the direction of the angular velocity of support structure about the Y axis with respect to inertial space or on which of fields $H_1$ or $H_2$ is the greater. Thus, the polarity of the output of integrator 59 determines whether or not the field will be increased or decreased and the polarity of the output of integrator 59' determines whether or not the support structure will be turned clockwise or counterclockwise about the Y axis. In both cases, however, if the frequency of the voltage applied to terminals 57 and 57' increases, the bridge output will be negative to secure one type of correction and if the frequency decreases the polarity of the bridge output will be positive to secure the opposite type of correction.

In the case of bridge 55, a positive output will cause a decrease in the field $H_2$ by rotating motor 60 in such a way as to increase the resistance of potentiometer 11 to reduce the current through winding 7. Conversely, if the output of bridge 55 is negative, motor 60 will be rotated oppositely to decrease the resistance of potentiometer 11 and increase the current through winding 7 to thus increase the strength of field $H_2$ and null the bridge output.

In the case of bridge 55', a positive output indicates an apparent decrease in the frequency of the rubidium electron magnetic moment precessing in container 14 with respect to those in container 15 which is due to a clockwise rotation of container 14 about the Y axis. Therefore, motor 60' is arranged to rotate the support structure counterclockwise to oppose the rotation whenever the bridge output is positive. On the other hand, a negative output indicates an apparent increase in the frequency of the rubidium electron magnetic moment precessing in container 14 with respect to those in container 15 which is due to a counterclockwise rotation of container 14 about the Y axis. Therefore, motor 60' is arranged to rotate the support structure clockwise to oppose the rotation whenever the bridge output is negative.

The system described so far is effective for detecting and correcting for rotations about a single axis. This may be extended to two or more axes. In FIGURE 2 three systems each identical to the system shown in FIGURE 1 are arranged on mutually perpendicular axes labeled X, Y and Z. Each of the systems is self contained and operates independently of the others. An arrangement such as that shown in FIGURE 2 will provide a platform which remains stable with respect to inertial space since any non-linear non-translatory motion of the supporting structure can be resolved into three components about the X, Y and Z axes, respectively.

While only one embodiment of the invention has been shown and described for illustration purposes it is to be expressly understood that the invention is not to be limited thereto.

What is claimed is:

1. An optically pumped magnetic resonance direction sensor comprising, means for providing two substantially equal and opposed unidirectional magnetic fields spaced from and parallel to each other, first and second dissimilar substances located in both of said fields, each of said dissimilar substances in both fields containing particles which exhibit magnetic resonance, means for irradiating said first and second substances in both fields with photon resonance radiation of at least one of said substances to produce inequality in the population of predetermined Zeeman substates of the particles which exhibit magnetic resonance associated with both substances, means for producing a pair of magnetic resonance signals from the particles in each of said fields, and phase comparison means for comparing the phase of the resonance signals of similar particles in the unidirectional fields and provide signals corresponding in magnitude and direction to the magnitude and direction of any phase shift therebetween.

2. An optically pumped magnetic resonance gyroscope comprising, means for providing two substantially equal and opposed unidirectional fields spaced from and parallel to each other, first and second dissimilar substances located in both of said fields, said substances each including particles which exhibit magnetic resonance, enclosure means for said substances, means for irradiating the substances with photon resonance radiation of at least one of the substances to produce inequality in the population of predetermined Zeeman substates of the particles associated with each substance which exhibit magnetic resonance, means for producing a pair of magnetic resonance signals from the particles in each of said fields, phase comparison means for comparing the phase of the resonance signals of similar particles in both unidirectional fields and provide signals corresponding in magnitude and direction to the magnitude and direction of any phase shift therebetween and servo means responsive to one of said signals for adjusting the strength of one of said unidirectional fields in accordance with that signal and to the other said signal for rotating said enclosure means about an axis parallel to said unidirectional fields to stabilize said enclosure means about said axis with respect to inertial space.

3. An optically pumped magnetic resonance direction sensor comprising, means for providing two substantially equal and opposed unidirectional magnetic fields spaced from each other and parallel to a common axis, first and second dissimilar substances located in both of said fields, each of said two dissimilar substances in both fields each containing particles exhibiting magnetic resonance, means for irradiating said first and second dissimilar substances in both fields with photon resonance radiation of at least one of said particles to produce inequality in the population of predetermined Zeeman substates of both particles, first means associated with the unidirectional fields for providing alternating magnetic fields having frequencies equal to the Larmor frequency of the resonant particles associated with each of the substances to cause the macroscopic moments of said particles to precess about said unidirectional fields, second means associated with said unidirection fields for detecting the precessional frequency of the macroscopic moments and provide electric signals corresponding thereto, and phase comparison means for comparing the phase of the electric signals corresponding to the precessional frequency of the particles of similar substances in the two unidirectional fields and provide signals corresponding in magnitude and direction to the magnitude and direction of any phase shift between said particles.

4. An optically pumped magnetic resonance gyroscope comprising, means for providing two substantially equal and opposed unidirectional magnetic fields spaced from and parallel to each other, first and second dissimilar substances located in both of said fields, said dissimilar substances each including particles which exhibit magnetic resonance, enclosure means for said substances, means for irradiating the substances to produce inequality in the population of predetermined Zeeman substates of the particles associated with both of the substances, first means associated with the unidirectional fields for providing alternating magnetic fields having frequencies equal to the Larmor frequency of the resonant particles associated with each of the substances to cause the macroscopic moments of said particles to precess about said unidirectional fields, second means associated with said unidirectional fields, for detecting the precessional frequency of the macroscopic moments and provide electric signals corresponding thereto, phase comparison means for comparing the phase of the electric signals corresponding to the precessional frequencies of the particles of similar substances in the two unidirectional fields and provide two signals corresponding in magnitude and direction to the magnitude and direction of any phase shift between said particles, and servo means responsive to one of said signals for adjusting the strength of one of the unidirectional magnetic fields in accordance with that signal and to the other said signal for rotating the enclosure means about an axis parallel to the unidirectional fields to stabilize the enclosure means about said axis with respect to inertial space.

5. An optically pumped magnetic resonance direction sensor comprising, means for providing two substantially equal and opposed unidirectional fields spaced from and parallel to each other, first and second dissimilar substances located in both of said fields, said substances each including particles which exhibit magnetic resonance, means for irradiating the substances with photon resonance radiation of at least one of the substances to produce inequality in the population of predetermined Zeeman substates of the particles associated with both substances which exhibit magnetic resonance, means for applying two alternating magnetic fields at right angles to the two unidirectional magnetic fields and coextensive therewith, said alternating magnetic fields each having a frequency substantially equal to the Larmor frequency of a different one of the resonant particles to cause the macroscopic moments of said particles to precess about the unidirectional fields, means for irradiating said substances with photon resonance radiation of at least one of said substances, said radiation being applied at right angles to the undirectional fields, means for continuously detecting the amplitude of said radiation after it traverses the substances and supply electric signals corresponding in frequency to the precessional frequency of the macroscopic moments, and phase comparison means for comparing the phase of the electric signals corresponding to the precessional frequency of the particles of similar substances in the two unidirectional fields and provide signals corresponding in magnitude and direction to the magnitude and direction of any phase shift between the said similar particles.

6. An optically pumped magnetic resonance gyroscope comprising, means for providing two substantially equal and opposed unidirectional magnetic fields spaced from and parallel to each other, first and second dissimilar substances located in both of said fields, said substances each including particles which exhibit magnetic resonance, enclosure means for said substances, means for irradiating the substances with photon resonance radiation of at least one of the substances to produce inequality in the population of predetermined Zeeman substates of the particles associated with both substances, means for applying two alternating magnetic fields at right angles to the two unidirectional magnetic fields and coextensive therewith, said alternating magnetic fields each having a frequency equal to the Larmor frequency of a different one of the resonant particles to cause the macroscopic moments of said particles to precess about the unidirectional fields, means for irradiating said enclosure and the contents with photon resonance radiation of at least one of said substance, said radiation being applied at right angles to the unidirectional fields, means for continuously detecting the amplitude of said radiation after it traverses the substances and supplying electric signals corresponding in frequency to the precessional frequency of the macroscopic moments, phase comparison means for comparing the phase of the electric signal corresponding to the precessional frequency of the particles of similar substances in the two unidirectional fields and provide two signals corresponding in magnitude and direction to the magnitude and direction of any phase shift between the said similar particles, and servo means responsive to one of said signals for adjusting the strength of one of the unidirectional magnetic fields in accordance with that signal and to the other said signal for rotating said enclosure means about an axis parallel to said unidirectional fields to stabilize said enclosure means about said axis with respect to inertial space.

7. An optically pumped magnetic resonance direction sensor suitable for detecting motion around a plurality of orthogonal axes including; a plurality of individual sensors each comprising, means for providing two substantially equal and opposed unidirectional magnetic fields spaced from and parallel to each other, first and second dissimilar substances located in both of said fields, each of said dissimilar substances in both fields containing particles which exhibit magnetic resonance, means for irradiating said first and second substances in both fields with photon resonance radiation of at least one of said substances to produce an inequality in the population of predetermined Zeeman substates of the particles which exhibit magnetic resonance associated with both substances, means for producing a pair of magnetic resonance signals from the particles in each of said fields, phase comparison means for comparing the phase of the resonance signals of similar particles in the unidirectional fields and provide signals corresponding in magnitude and direction to the magnitude and direction of any phase shift therebetween; said individual sensors being arranged so that the opposed unidirectional magnetic fields of each of the individual sensors are parallel to a different one of said orthogonal axes.

8. An optically pumped magnetic resonance gyroscope suitable for stabilizing a structure with respect to inertial space about a plurality of orthogonal axis including; a plurality of individual gyroscopes each comprising, means for providing two substantially equal and opposed unidirectional fields spaced from and parallel to each other, first and second dissimilar substances located in both of said fields, said substances each including particles which exhibit magnetic resonance, enclosure means for said substances, means for irradiating the substances with photon resonance radiation of at least one of the substances to produce an inequality in the population of predetermined Zeeman substates of the particles associated with each substance which exhibit magnetic resonance, means for producing a pair of magnetic resonance signals from the particles in each of said fields, phase comparison means for comparing the phase of the resonance signals of similar particles in both unidirectional fields and provide signals corresponding in magnitude and direction to the magnitude and direction of any phase shift therebetween and servo means responsive to one of said signals for adjusting the strength of one of said unidirectional fields in accordance with that signal and to the other said signal for rotating said enclosure means about an axis parallel to said unidirectional fields to stabilize said enclosure means about said axis with respect to inertial space; said individual gyroscopes being arranged so that the opposed unidirectional magnetic fields of each individual gyroscope are parallel to a different one of said orthogonal axis.

9. An optically pumped magnetic resonance direction sensor suitable for detecting motion around a plurality of orthogonal axes including; a plurality of individual sensors each comprising, means for providing two substantially equal and opposed unidirectional magnetic fields spaced from each other and parallel to a common axis, first and second dissimilar substances in both of said fields, each of said two dissimilar substances in both fields each containing particles exhibiting magnetic resonance, means for irradiating said first and second dissimilar substances in both fields with photon resonance radiation of at least one of said particles to produce inequality in the population of predetermined Zeeman substates of both particles, first means associated with the unidirectional fields for providing alternating magnetic fields having frequencies equal to the Larmor frequency of the resonant particles associated with each of the substances to cause the macroscopic moments of said particles to precess about said unidirectional fields, second means associated with said unidirectional fields for detecting the precessional frequency of the macroscopic moments and provide electric signals corresponding thereto, and phase comparison means for comparing the phase of the electric signals corresponding to the precessional frequency of the particles of similar substances in the two unidirectional fields and provide signals corresponding in magnitude and direction to the magnitude and direction of any phase shift between said particles; said individual sensors being arranged so that the opposed unidirectional magnetic fields of each of the individual sensors are parallel to a different one of said orthogonal axes.

10. An optically pumped magnetic resonance gyroscope suitable for stabilizing a structure with respect to inertial space about a plurality of orthogonal axes including; a plurality of individual gyroscopes each comprising, means for providing two substantially equal and opposed unidirectional magnetic fields spaced from and parallel to each other, first and second dissimilar substances located in both of said fields, said dissimilar substances each including particles which exhibit magnetic resonance, enclosure means for said substances, means for irradiating the substances to produce inequality in the population of predetermined Zeeman substates of the particles associated with the unidirectional fields for providing alternating magnetic fields having frequencies equal to the Larmor frequency of the resonant particles associated with each of the substances to cause the macroscopic moments of said particles to precess about said unidirectional fields, second means associated with said unidirectional fields for detecting the precessional frequency of the macroscopic moments and provide electric signals corresponding thereto, phase comparison means for comparing the phase of the electric signals corresponding to the precessional frequencies of the particles of similar substances in the two unidirectional fields and provide two signals corresponding in magnitude and direction of any phase shift between said particles, and servo means responsive to one of said signal for adjusting the strength of one of the unidirectional magnetic fields in accordance with that signal and to the other said signal for rotating the enclosure means about an axis parallel to the unidirectional fields to stabilize the enclosure means about said axis with respect to inertial space; said individual gyroscopes being arranged so that the opposed unidirectional magnetic fields of each individual gyroscope are parallel to a different one of said orthogonal axes.

11. An optically pumped magnetic resonance direction sensor suitable for detecting motion around a plurality of orthogonal axes including; a plurality of individual sensors each comprising, means for providing two substantially equal and opposed unidirectional fields spaced from and parallel to each other, first and second dissimilar substances located in both of said fields, said substances each including particles which exhibit magnetic resonance, means for irradiating the substance with photon resonance radiation of at least one of the substances to produce inequality in the population of predetermined Zeeman substates of the particles associated with both substances which exhibit magnetic resonance, means for applying two alternating magnetic fields at right angles to the two unidirectional magnetic fields and coextensive therewith, said alternating magnetic fields each having a frequency substantially equal to the Larmor frequency of a different one of the resonant particles to cause the macroscopic moments of said particles to precess about the unidirectional fields, means for irradiating said substances with photon resonance radiation of at least one of said substances, said radiation being applied at right angles to the unidirectional fields, means for continuously detecting the amplitude of said radiation after it traverses the substances and supplying electric signals corresponding in frequency to the precessional frequency of the macroscopic moments, phase comparison means for comparing the phase of the electric signals corresponding to the precessional frequency of the particles of similar substances in the two unidirectional fields and provide signals corresponding in magnitude and direction to the magnitude and direction of any phase shift between the said similar particles; said individual sensors being arranged so that the opposed unidirectional magnetic fields of each of the individual sensors are parallel to a different one of said orthogonal axes.

12. An optically pumped magnetic resonance gyroscope suitable for stabilizing a structure with respect to inertial space about a plurality of orthogonal axes including; a plurality of individual gyroscopes each comprising, means for providing two substantially equal and opposed unidirectional magnetic fields spaced from and parallel to each other, first and second dissimilar substances located in both of said fields, said substances each including particles which exhibit magnetic resonance, enclosure means for said substances, means for irradiating the substances with photon resonance radiation of at least one of the substances to produce inequality in the population of the predetermined Zeeman substates of the particles associated with both substances, means for applying two alternating magnetic fields at right angles to the two unidirectional magnetic fields and coextensive therewith, said alternating magnetic fields each having a frequency equal to the Larmor frequency of a different one of the resonant particles to cause the macroscopic moments of said particles to precess about the unidirectional fields, means for irradiating said enclosure and the contents with photon resonance radiation of at least one of said substance, said radiation being applied at right angles to the unidirectional fields, means for continuously detecting the amplitude of said radiation after it traverses the substances and supplying electric signals corresponding in frequency to the precessional frequency of the macroscopic moments, phase comparison means for comparing the phase of the electric signal corresponding to the precessional frequency of the particles of similar substances in the two unidirectional fields and provide two signals corresponding in magnitude and direction to the magnitude and direction of any phase shift between the said similar particles, and servo means responsive to one of said signals for adjusting the strength of one of the unidirectional magnetic fields in accordance with that signal and to the other said signal for rotating said enclosure means about an axis parallel to said unidirectional fields to stabilize said enclosure means about said axis with respect to inertial space; said individual gyroscopes being aranged so that the opposed unidirectional magnetic fields of each individual gyroscope are parallel to a different one of said orthogonal axes.

References Cited in the file of this patent
UNITED STATES PATENTS 2,720,625    Leete ------------------ Oct. 11, 1955

OTHER REFERENCES

Bell and Bloom: A paper published in Physical Review vol. 107, number 6, pp. 1559 to 1565, Sept. 15, 1957.